United States Patent [19]
Beals

[11] Patent Number: 5,214,836
[45] Date of Patent: Jun. 1, 1993

[54] METHOD FOR MAKING FILING CABINET INCLUDING ADHESIVE BONDING

[75] Inventor: Ralph Beals, Muscatine, Iowa

[73] Assignee: Hon Industries Inc., Muscatine, Iowa

[21] Appl. No.: 860,561

[22] Filed: Mar. 30, 1992

Related U.S. Application Data

[60] Continuation of Ser. No. 518,129, May 3, 1990, abandoned, which is a division of Ser. No. 279,330, Dec. 2, 1988, Pat. No. 5,102,210, which is a continuation of Ser. No. 30,052, Mar. 24, 1987, abandoned.

[51] Int. Cl.$^5$ .................. B21D 35/00; B42F 7/00; A47B 47/03
[52] U.S. Cl. .................. 29/469.5; 29/412; 29/897; 29/DIG. 1; 29/DIG. 3; 312/185
[58] Field of Search ............. 29/422, 423, 434, 469.5, 29/462, 773, 897, 513, 412, 904, DIG. 1, DIG. 3; 220/445, 902; 229/117.16; 312/183, 185, 236, 257.1; 402/8, 14, 18

[56] References Cited

U.S. PATENT DOCUMENTS

| | | |
|---|---|---|
| 1,055,697 | 3/1913 | Beecher . |
| 1,200,882 | 10/1916 | Schaefer . |
| 1,238,215 | 8/1917 | Terrell . |
| 1,282,833 | 10/1918 | Holder . |
| 1,292,946 | 1/1919 | Yawman . |
| 1,321,097 | 11/1919 | Gonzalez . |
| 1,340,562 | 5/1920 | Sandmann . |
| 1,450,180 | 4/1923 | Jamison . |
| 1,523,653 | 1/1925 | Larson . |
| 2,027,154 | 1/1936 | Derman . |
| 2,155,128 | 4/1939 | Gray .................. 312/204 X |
| 2,437,665 | 3/1948 | Rose . |
| 2,520,506 | 8/1950 | Mankki . |
| 2,547,463 | 4/1951 | Haut . |
| 3,399,941 | 9/1968 | Hansen . |
| 3,437,392 | 4/1969 | Hilfinger . |
| 3,497,279 | 2/1970 | Chovanec . |
| 3,563,627 | 2/1971 | Whipps . |
| 3,738,726 | 6/1973 | Burst . |
| 3,875,633 | 4/1975 | Cornell ................ 29/434 X |
| 3,909,090 | 9/1975 | Breckner . |
| 3,969,008 | 7/1976 | Pergler . |
| 3,999,820 | 12/1976 | Haag .................. 312/236 X |
| 4,102,554 | 7/1978 | Reimer . |
| 4,145,100 | 3/1979 | Klaus .................. 312/183 X |
| 4,161,125 | 7/1979 | Degnan . |
| 4,232,920 | 11/1980 | Bukaitz . |
| 4,272,139 | 6/1981 | Fler .................. 312/333 X |
| 4,288,132 | 9/1981 | Znamirowski et al. ...... 312/111 X |
| 4,433,788 | 2/1984 | Erlam . |
| 4,438,994 | 3/1984 | Davis . |
| 4,500,146 | 2/1985 | Peterson . |
| 4,541,675 | 9/1985 | Evertt . |
| 4,561,706 | 12/1985 | Grati . |
| 4,586,348 | 5/1986 | Nakayama . |
| 4,595,247 | 6/1986 | Zank . |
| 4,671,581 | 6/1987 | Faust . |
| 4,717,215 | 1/1988 | Everts .................. 312/185 X |
| 4,788,395 | 11/1988 | Sakoda .................. 29/513 X |
| 4,817,861 | 4/1989 | Henrikson .............. 229/117.16 X |

FOREIGN PATENT DOCUMENTS

| | | | |
|---|---|---|---|
| 340319 | 11/1989 | European Pat. Off. ...... | 229/117.16 |
| 1447386 | 6/1966 | France . | |

*Primary Examiner*—Mark Rosenbaum
*Assistant Examiner*—Peter Dungba Vo
*Attorney, Agent, or Firm*—Leydig, Voit & Mayer Ltd.

[57] ABSTRACT

The present invention relates to a rugged and inexpensive filing cabinet constructed from thin, prefinished metal and the method for making the same. All component parts including the case envelope, case back, kickplate, drawers and drawer supports are designed to be cut from a minimum of four discrete coils of metal with waste attributable to trimming or removal of excess metal maintained at a minimum. Ruggedness and strength are maintained, despite the relative thinness of the metal, because the vertical corners and other potentially critical areas subjected to increased stress are reinforced with structural elements adhesively bonded in place. Certain structural elements also function as jigging members during the adhesive bonding of the component parts. In addition, the design of the present invention provides a versatile and adaptable end product due to the interchangeability of cetain component parts.

60 Claims, 6 Drawing Sheets

METHOD FOR MAKING FILING CABINET INCLUDING ADHESIVE BONDING

This is a continuation of copending application Ser. No. 518,129 (now abandoned), filed on May 3, 1990 as a division of application Ser. No. 279,330, filed on Dec. 2, 1988 and entitled low cost filing cabinet and method for making the same, now U.S. Pat. No. 5,102,210 issued Apr. 7, 1992, which was a continuation of prior application Ser. No. 30,052, filed on Mar. 24, 1987 and now abandoned, all by the same inventor.

BACKGROUND OF THE INVENTION

1. Field of the Invention

This invention relates to metal filing cabinets and to methods for constructing such cabinets. More particularly, this invention relates to forming very low-cost but sturdy filing cabinets by using prefinished light gauge steel and preferably by using designs and techniques which minimize the variety of steel stock widths that are required while also minimizing the scrap or waste. For example, an entire cabinet and component parts, including the case envelope, drawers, track assemblies and other structural members, may be constructed from only four discrete widths of prepainted, light gauge steel. Yet, despite the use of light gauge steel, e.g., 0.0195 inches or thinner, the cabinet case provides rigid and structurally strong file cabinets. Furthermore, as a result of using the light gauge metal, the cabinet of the present invention may be 20 to 30 percent lighter in weight and steel usage than conventional cabinets. In addition, the use of prepainted or other prefinished metal readily permits a virtually unlimited color selection as well as simulated wood grain and other patterns at a cost significantly less than the cost of creating these same finishes on cabinets which are assembled prior to finishing. This fact in combination with the use of light gauge metal allows the cabinet to be constructed at a cost significantly below that of present techniques while, at the same time, improving structural strength and marketing flexibility.

More particularly, and with respect to the preferred embodiment, each component part of a file cabinet may be stamped from one of only four discrete widths of prepainted sheet metal. These flat blanks are folded as necessary to form the component parts and are assembled into the cabinet structure. The case in particular is assembled by a combination of adhesively bonding and mechanically fastening the component pieces together. The components of the drawer also may be assembled by adhesive bonding or may be secured by mechanical fastening techniques. In comparison to welding or any other method of mechanically fastening metal, adhesive bonding is superior in most instances because it can provide complete or 100 percent attachment between the joined metal surfaces. This, in effect, creates a single part from multiple pieces whereas mechanical fastening or welding between separate pieces of metal only provides small areas of attachment at the sites of the attachments or welds. The components are still separate everywhere else along their interface. Consequently, the present design and method of construction allows lightweight and thin gauge metal to be used and insures a lightweight cabinet of superior strength and rigidity.

2. Discussion of the Prior Art

Originally, metal filing cabinet case envelopes or shells were made from separate side, top, back and bottom walls welded or otherwise fastened together and then painted on the outside. Drawers were made in much the same manner with the separate bottom, sides and end walls welded or otherwise fastened together. While many filing cabinets are still constructed this way today, alternate methods of assembly have arisen which have allowed manufacturers to construct file cabinets from prepainted or prefinished steel. Because the finish on prepainted steel is ruined if welded, requiring the metal to be repainted, it is highly desirable to avoid welding as the method for assembling the component pieces into a final filing cabinet. One proposed alternative cabinet design employs extruded corner posts with long narrow slots which slidably engage separate, prepainted, rectangular shaped side and end pieces thereby avoiding welding or even riveting the pieces together. Other proposed designs for cabinets or similar structures rely upon folding various portions of a single piece of prepainted metal together and either interlock the portions or use mechanical fasteners. Such designs, however, would not achieve the desirable, low cost, lightweight, simple and high strength characteristics obtained by the present invention.

Forming of appliance housing from prefinished or prepainted metal has been employed by appliance manufacturers for some time. For example, refrigerator cases have been formed in this manner. However, refrigerator housings are typically made of heavy gauge steel and normally have an inner or second shell. This construction provides ample strength to the exterior housing structure.

Adhesively bonding or gluing cabinet case envelopes together is used in the cardboard or hard wood box area. However, cardboard boxes do not have the structural strength nor the exterior appearance found in a metal cabinet. In the case of hardwood boxes, strength is certainly available but limitations as to exterior appearances and weight become significant factors.

Adhesively bonding cabinets of any material raises a manufacturing problem of holding or restraining the cabinet while the adhesive sets. This adds both time and expense to the manufacture of the product by requiring special clamps or vises as well as the labor necessary to install and remove these clamps or vises. The present invention is specifically designed to eliminate a large portion of the assembly problems associated with adhesively bonding metal. To this end, the preferred embodiment employs interfitting components which are wedge fit together and therefore act as self restraining clamps to hold the assembled pieces in position while the adhesive sets to bond the components to one another. The design of the vertical channels allows them to cooperate with the interior corners of the cabinet envelope so that the track assemblies can be wedged into the cabinet to hold the various edges of the envelope side, top and back walls in place while the adhesive bond is set. As a result, an integral component of the cabinet takes the place of a special clamp and does not need to be removed after the adhesive bonding has set thereby saving significant production costs.

In addition to providing this self clamping function, the vertical corner channels provide the cabinet with structural rigidity, ruggedness or impact resistance and strength. This allows the cabinet pieces to be manufactured from thin gauge metal. While the prior art discloses internal posts and corner supports for providing both strength and structural framing to cabinets and other similar hollow structures, these frame members are typically mechanically fastened to the cabinet case. In the present invention, the corner channels are adhesively bonded to the interior surface of the case envelope to provide a complete surface-to-surface attachment. The result of this total bond is to create, in effect, a one piece structure of superior strength and ruggedness in comparison to a structure formed by mechanically fastening multiple pieces together.

A further feature of the present invention and not found in the prior art is that the entire filing cabinet, including the component parts, is constructed from prefinished sheet metal. Painting both sides of a roll of steel is much simpler and certainly less costly than painting the complex shape of a finished cabinet. Moreover, by using prepainted metal, not only is the interior of the cabinet painted, thereby providing a more aesthetically pleasing and better protected finished product, but a wide variety of exterior styles are available including simulated wood grain and an essentially unlimited number of patterns. These types of finishes are extremely costly to put on a completed cabinet and requires a high degree of skill to avoid ruining the exterior appearance of the cabinet.

However, not only is the cabinet constructed from prefinished metal, but it is constructed from a very limited inventory of widths of the prefinished metal strips or coils.

Still another factor in reducing the inventory required to assemble these cabinets and, consequently, a factor in reducing the cost of the overall cabinet is that many of the component parts are reversibly or symmetrically designed in order that one part can be utilized in more than one place. For example, the vertical corner channels are identical multisided members which, as a result of the particular cross sectional shape, can be placed in each of the four corners of the cabinet simply by rotating the relative position of the vertical channel. As a result, only one type of corner channel rather than two or four distinct types is required. Moreover, this same vertical channel, when cut to an appropriate length, functions as a horizontal slide track. Consequently, the versatility of the design allows one manufactured shape to be used for at least two separate pieces.

The versatility of the structure is further evidenced by the design of a second drawer track, in this case a roller track, that is interchangeable with the slide track. Both of these drawer tracks, roller or slide, are designed so that each drawer track can function on either the right or left side of the cabinet. As a result, separate right and left side pieces do not need to be constructed.

The versatility of the present design is still further shown in the drawer construction. The design employs a single drawer base unit which accommodates two different drawer fronts. One drawer front, a "box drawer" front, is slightly taller than the base drawer unit and the other drawer front, or "letter drawer" front, is almost twice as tall as the box front and creates a drawer for much larger articles but employs the same drawer base unit. In addition, drawer extensions or holder rails have been designed as an accessory to attach to the base unit and the letter drawer front to create a drawer for hanging files. These holder rails are manufactured from the same width of prepainted steel as the vertical channels but, in the spirit of the present invention, are reversible and symmetrical in the same manner as the drawer tracks so that any one extension can fit on either the right or left side of the drawer base unit.

As can be seen, all of these features reduce the number of parts necessary to manufacture and to provide in inventory. In addition, these features reduce the number of different parts which are required to assemble a completed cabinet and thereby reduce the cost to produce the overall cabinet. More importantly, these features combine to create an inexpensive, lightweight filing cabinet of superior strength.

OBJECTS OF THE INVENTION

It is a general object of this invention to provide an improved, light weight, economical filing cabinet having improved structural strength.

It is another object of this invention to provide an improved method of constructing low cost filing cabinets by constructing the component elements from a limited inventory of prefinished metal blanks.

It is still another object of this invention to provide a versatile cabinet in which many of the component pieces are interchangeable.

It is another object of this invention to provide a cabinet which is assembled by adhesively bonding component parts and which is partially self clamping.

Other objects and advantages will become apparent upon reading the following detailed description and appended claims, and upon reference to the accompanying drawings.

IN THE DRAWINGS

For a more complete understanding of this invention, reference should now be made to the embodiment illustrated in greater detail in the accompanying drawings and described below by way of examples of the invention.

SUMMARY OF THE INVENTION

The present invention relates to a strong and rugged filing cabinet which is simple and inexpensive to manufacture and assemble and a method for making the same. In accordance with one embodiment, the entire cabinet and component parts are constructed from four discrete widths of prefinished, light gauge metal. An integral cabinet envelope, comprising a top and two side walls, is formed from one width of prefinished metal. The cabinet envelope is provided with front and rear perimeter flanges and a pair of base flanges at the bottom of each side wall. A cabinet back panel and kickplate are formed from a second width of prefinished metal and are adhesively bonded to the cabinet envelope to create the basic shell structure. In addition, a pair of track assemblies are employed to act as self restraining clamps to hold the assembled envelope and back panel in place while the adhesive sets to bond the components to one another.

The track assemblies are each constructed from a pair of vertical channel members interconnected by a pair of drawer tracks. Besides performing the clamping function, the track assemblies, through the vertical channel members, provide structural strength and ruggedness to the otherwise thin walled cabinet envelope. The vertical channels are roll formed from a third discrete width of prefinished metal. The drawer tracks are provided in two separate shapes; a slide track and a roller track. The slide track is identical in structure to the vertical channel member and slidably engages the side walls of the drawer base unit. In comparison, the second drawer track or roller track is formed from a fourth width of prefinished metal and employs freely rotating rollers to engage the side walls of the drawer base unit.

The drawer structure is assembled from a drawer base unit and either one of two interchangeable drawer fronts. The drawer base unit includes a drawer bottom and two drawer sides, formed from the fourth width of metal, and a drawer back formed from the second width of metal. The two drawer fronts are a box drawer front and a letter drawer front and are both formed from the second width of prefinished metal. The availability of two different drawer fronts allows drawers of two different sizes and capacities to be assembled from the same component parts and in any necessary mix or variation.

DETAILED DESCRIPTION OF THE INVENTION

The relationship and use of the various features of this invention will be better understood by the following detailed description. However, the embodiment of the invention described below is by way of example only and applicant does not limit himself to this embodiment. Furthermore, one should understand that the drawings are not to scale and that the embodiments are illustrated in part by graphic symbols and fragmentary views. In certain instances, details may have been omitted which are not necessary for an understanding of the present invention.

Figures 1, 2:
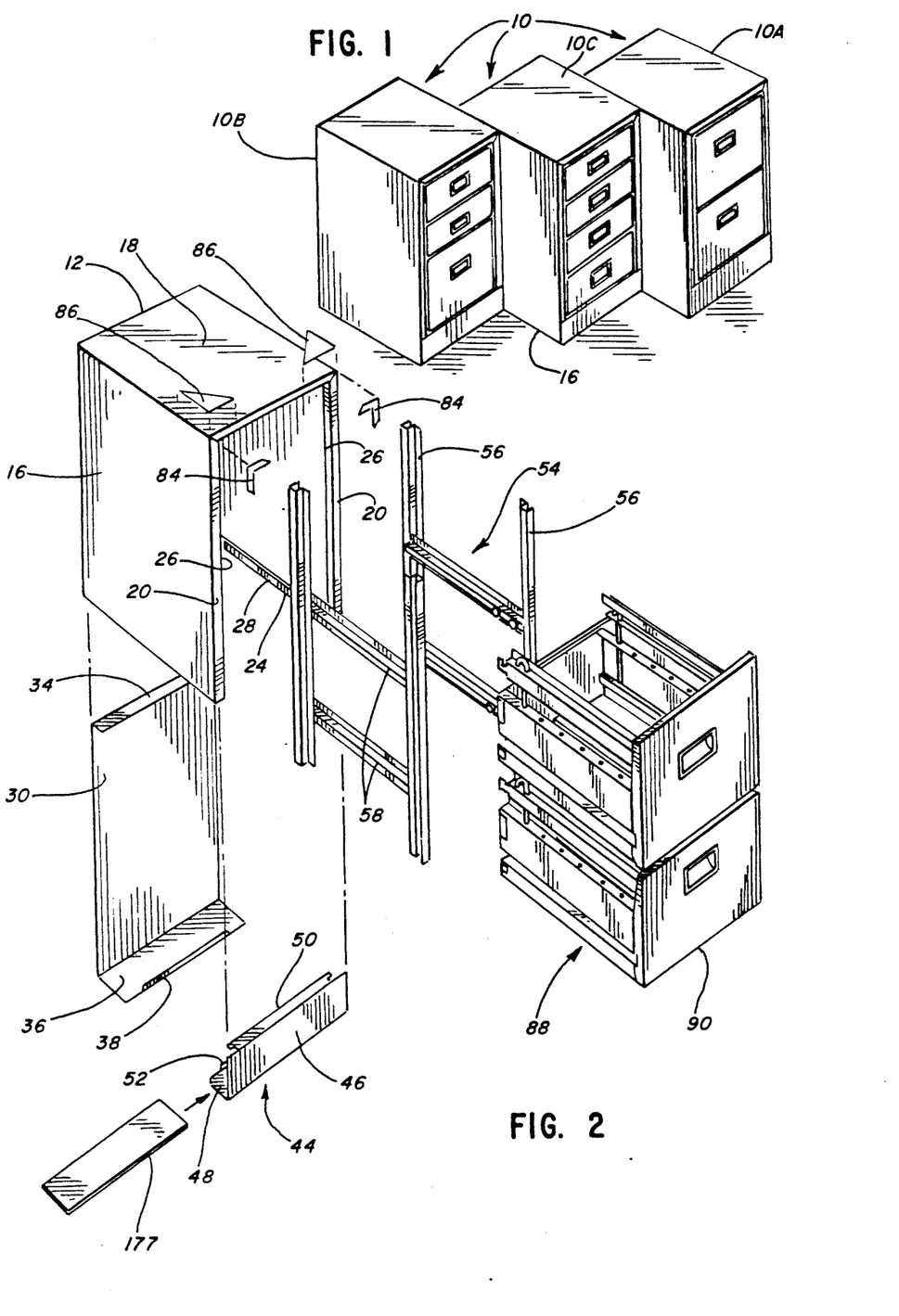
FIG. 1 is a perspective view of three filing cabinets employing teachings of the present invention.
FIG. 2 is an exploded perspective view of the two-drawer filing cabinet of FIG. 1.

A filing cabinet 10 of the present invention, shown in various final forms in FIG. 1, is constructed from only four discrete widths of sheet metal blanks. Each of these blanks is of a width to form the respective component(s) without edge trimming and attendant scrap or waste, and is of indeterminate length, preferably being supplied and inventoried in coil form. The sheet metal is prepainted on both sides and the element or component pieces are stamped out from these four coils of sheet metal. FIGS. 13-16 show the four rolls of metal strip blanks and the silhouette of the respective component parts that are cut from each roll. FIGS. 13A-16A show the profiles of the component parts. After being cut from the continuous rolls, these pieces of sheet metal or blanks are folded into the various component parts which make up the filing cabinet and are assembled into the final product.

The present invention provides sufficient versatility to create at least three basic styles of cabinets (as illustrated in FIG. 1) from one standard cabinet envelope. As seen in FIG. 1, the final product can be a two (10A), three (10B) or four (10C) drawer unit. Of course, it is recognized that case envelopes of different sizes can be manufactured in accordance with the present invention to provide either one drawer cabinets or cabinets of more than four drawers. Similarly, separate cabinets could be combined or stacked to form larger cabinets.

It can be seen from FIGS. 13-16 that all the components originate from one of only four widths of prepainted metal. Specifically, the case envelope is cut from one roll of metal, FIG. 15. The drawer bottom, both drawer sides and the roller track members are cut from a second roll of metal, FIG. 14. The drawer front and back, the kickplate and option strap and the case back are cut from a third width, FIG. 16; and, the vertical channels, the slide track members and the strengthening chevrons, corner plates and holder rails are cut from the fourth roll of metal, FIG. 13.

Figure 15:
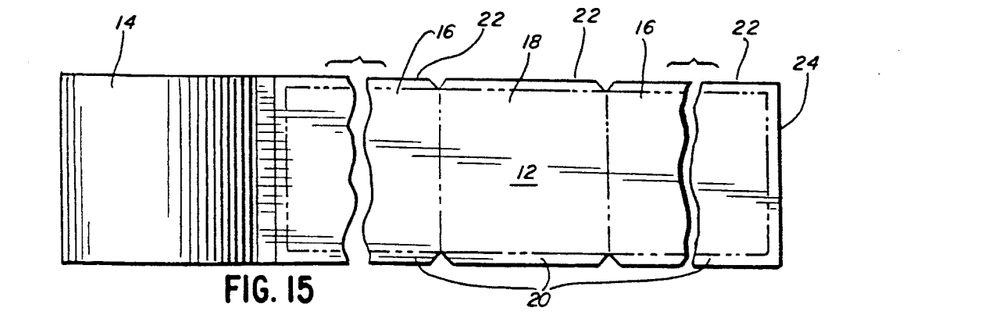
FIG. 15 is a top view of another prefinished sheet steel blank strip of indeterminate length supplied in coil form used to make the case envelope with certain cut and fold lines illustrated on the blank strip.

Turning now to the particular component parts of a cabinet 10, the case envelope 12 starts out as a flat piece of prepainted steel as shown in FIG. 15. The individual case envelope blank is cut from the coil 14 and folded into a three sided shape having two side walls 16 and a top 18 (FIG. 2). As can be seen from FIG. 15, the depth of the cabinet is contingent upon the width of the coil of metal from which it is formed. Consequently, by using varying widths of metal, cabinets can be manufactured in conventional depths between 14 and 25 inches. The perimeter edges of the case envelope or shell are folded inwardly to provide a front wall portion or a front perimeter flange 20, a rear perimeter flange 22 and a base flange 24 at the bottom edge of each side wall 16. The front wall portion or perimeter flange 20 and the base flanges 24 are folded a second time to form return flanges 26 and 28 respectively. All of these flanges provide structural rigidity to the case envelope and further assist in the assembly of the cabinet.

Figure 16:
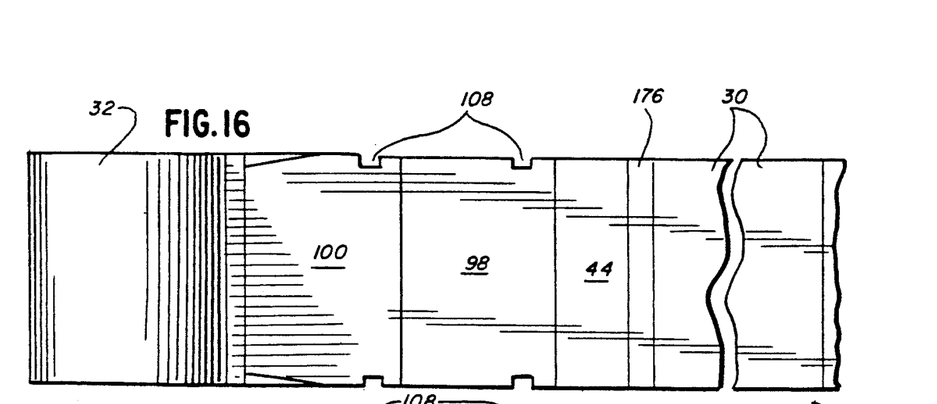
FIG. 16 is a top view of another prefinished steel blank strip of indeterminate length supplied in coil form used to make the letter and box drawer fronts, drawer back, kickplate, strap and case back with certain cut and fold lines illustrated on the blank strip.
Figure 16A:
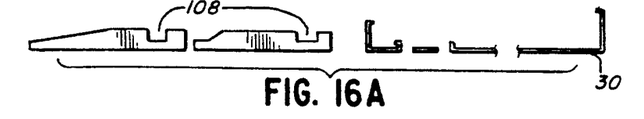
FIG. 16A is an end view of the drawer fronts, drawer back, kickplate, strap and case back made from the prefinished steel strip shown in FIG. 16.

The case back 30, FIGS. 2 and 16, is cut from a blank of prefinished or prepainted steel from a coil 32 of a different width than the case envelope 12. It has a top flange 34 and a bottom flange 36 which provide case rigidity when bonded and fastened to the case envelope and which assists in placing or locating the case back to be adhesively bonded to the case envelope 12 in the proper relative position. The bottom flange 36 is provided with a small return flange 38. The return flange is narrower than the case back by the requisite amount to accommodate the base flanges 24 of the case envelope side walls 16 when the two pieces are bonded together. The return flange 38 functions to accurately and squarely align the side walls and the case back by providing a stop or locater for the base flanges of the side walls.

Before the case back is put in place with the envelope 12, a bead of glue or adhesive 40 is placed along each of the surfaces which will be in contact. In joining these two pieces, the adhesive 40 will be placed on the inside surface of the rear perimeter flange 22 and on the upper lateral edges of the bottom flange 36 of the case back 30 as well as the upper surface of the case back top flange 34. The case back is then positioned inside the case envelope so that the exterior surface 42 abuts the rear perimeter flange 22 of the case envelope, the upper surface of the top flange 34 contacts the inside surface of the case envelope top 18 and the bottom flange 36 underlies and contacts the base flanges 24 of the case envelope side walls 16. Once the bond is set, the case back 30 will be strongly bonded to the case envelope 12. As a result of this 100 percent surface-to-surface bond, the case back 30 will act to inhibit side sway in the cabinet. In addition, to add further strength and rigidity to the case structure, the case back bottom flange 36 and the base flanges 24 of the case envelope side walls 16 can be mechanically fastened in addition to being adhesively bonded.

The cabinet kickplate 44, FIG. 16, is formed from the same roll of prefinished sheet metal 32 as the case back 30 and encloses the lower front corner of the case envelope 12. The kickplate 44 is provided with a front or upper portion 46 and a lower portion 48 wherein the upper portion 46 extends across the front opening of the case envelope and the lower portion 48 extends across the bottom opening of the case envelope. The upper portion 46 is further provided with an inwardly directed flange 50 notched to accommodate the front perimeter flanges 20 and return flange 26 of the case envelope, and serve as a stop or locator for the lower front portion of the envelope during assembly. The bottom portion of the kickplate 44 has an upturned flange 52 which functions similarly to the return flange 38 formed on the bottom flange 36 of the case back 30; which also assists in squarely aligning the case envelope. After bonding the track assemblies 54 to the case envelope 12, the kickplate 44 is adhesively bonded to the case envelope 12 along the contacting surfaces of the front perimeter flange 20 and upper portion 46 and the base flanges 24 of the side walls 16 and the lower portion 48. The lower portion 48 also may be mechanically fastened to the base flange 24 of the case side walls 16 to provide further structural rigidity to the case 10.

Figure 13:
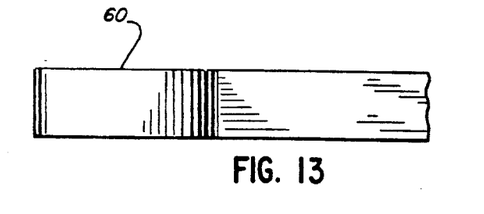
FIG. 13 is a top view of a prefinished sheet steel blank strip of indeterminate length supplied in coil form and used to make the vertical channel, slide track members and holder rails.
Figures 13A, 13B:
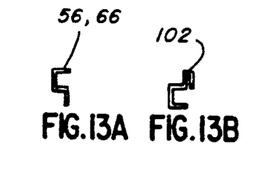
FIG. 13A is a schematic end view of the vertical channel or slide track produced from the prefinished steel strip shown in FIG. 13.
FIG. 13B is a schematic end view of the holder rail produced from the prefinished strip shown in FIG. 13.

Turning now to the track assembly 54, it can be seen from FIG. 2 that each track assembly 54 is constructed from two vertical channels or corner posts 56 interconnected by two drawer tracks 58. The vertical channels 56 are multisided structural and reinforcing members which provide strength to the overall cabinet 10, and the drawer tracks 58 provide sliding support engagement for the drawers. Each vertical channel is roll formed from a third discrete width of prepainted sheet metal 60 as shown in FIG. 13. The vertical channel is a four sided structural member with three of the sides forming an open sided channel 62 and the fourth side forming a support flange 64 extending outwardly from the channel. Thus, surfaces are provided at right angles to one another to support the side walls of the case on both sides of each corner while providing an appropriate flat surface for attachment of the tracks; see FIG. 3 and FIGS. 3A-D. The strength and impact resistance (ruggedness) provided by the vertical channels 56 allow the filing cabinet to be constructed from metal as thin as 0.195 inches and even thinner if desired. Moreover, the vertical channels 56 reduce or remove the need for using elaborate and expensive shipping materials to protect the final product during handling and shipping for distribution. All that is necessary is a cardboard enclosure to protect the exterior finish. This provides another cost advantage.

Figures 3, 3A, 3B, 3C, 3D, 4:
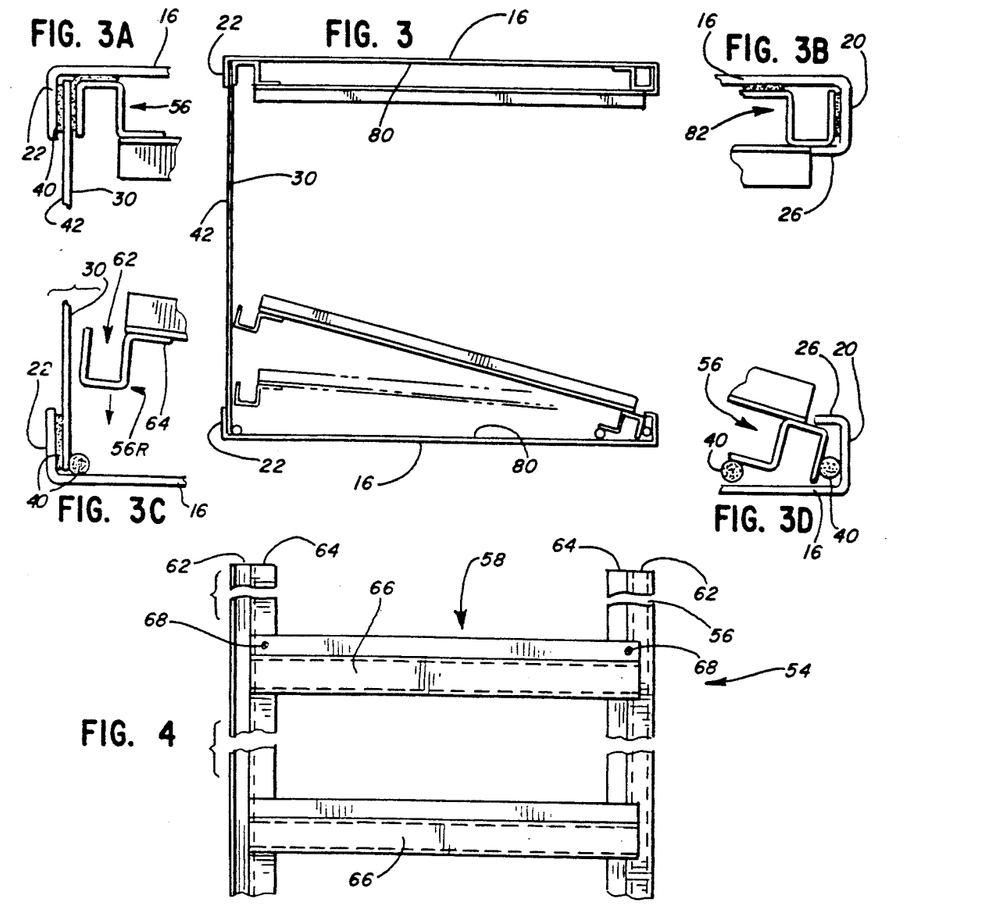
FIG. 3 is a horizontal, sectional view of a filing cabinet of the present invention further showing insertion of a track assembly.
FIGS. 3A and 3B are enlarged partial top views of the vertical channels adhesively bonded to the interior corners of the case envelope.
FIGS. 3C and 3D are enlarged partial top views of the vertical channels being positioned in the case envelope.
FIG. 4 is a side view of a track assembly employing slide track drawer tracks.
Figure 5:
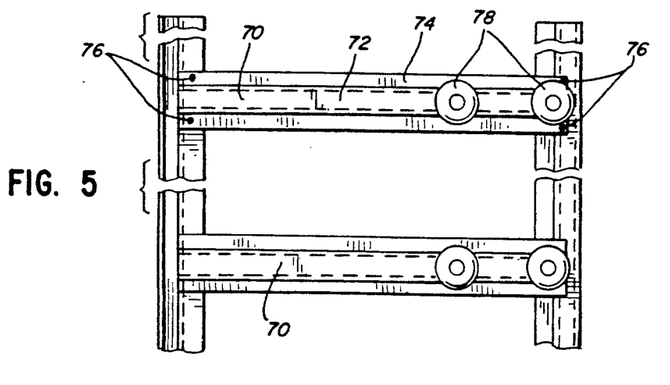
FIG. 5 is a side view of a track assembly employing roller track drawer tracks.

The present invention provides two types of drawer tracks 58. One type, slide tracks 66, are shown in FIGS. 4 and 11. The slide tracks are the same cross-sectional sizes and configuration as the vertical channel 56 but cut to a shorter length. In the context of a slide track 66, the outwardly extending flange 64 is mechanically fastened at 68 to the vertical channel 56 as shown in FIG. 4. In comparison, the second type of track 58, the roller track 70 (FIG. 5), has a raised center portion 72 with two outwardly extending support flanges 74 which abut the vertical channel 56 (see also FIG. 10) and is formed from a different coil of metal than the slide track. The roller track is affixed to the vertical channels at four locations by mechanical attachments at 76 and thereby provides greater strength for supporting heavier loads. In addition, the roller track 70 employs two rollers 78 riveted to the raised center 72 for engaging the drawer base unit. (FIG. 5).

As shown in FIG. 3, a separate track assembly 54 is placed along each internal side wall 80 of the case envelope 12 with a vertical channel disposed in each corner of the case envelope. The four corners of the cabinet are shown in FIGS. 3A-D. The manner in which the track assembly 54 is attached provides a self clamping action for both the envelope-back joints and for the track assembly-envelope joints, which avoids the necessity of employing special clamps or vises as well as the labor necessary to remove such devices after the adhesive bonds have set. After the case back 30 has been positioned, FIG. 3, an additional bead of glue or adhesive 40 is placed in each rear corner of the case envelope 12, FIG. 3C. In addition, two beads of adhesive 40 are placed on each front corner vertical channel 56F, FIG. 3D. The track assembly 54 is then wedged into the case envelope 12 by first placing the forward vertical channel 56F in the recess formed by the front wall portion or perimeter flange 20 and return flange 26 of the case envelope (FIG. 3, 3D) and then rotating the track assembly 54 until the rear vertical channel 56R is wedged into the back corner of the case envelope thereby spreading the adhesive 40 and bonding the vertical channel 56 to the case back 30 and case side wall 80, (FIGS. 3, 3C). In this manner the track assembly 54 also acts to press the case back onto the rear perimeter flange 22 of the case envelope 12 and holds these pieces together, without employing any external jigging, while the adhesive bonds the metal edges together. Thereby the front and rear flanges of the envelope serve as the clamps or straps for the entire assembly.

Notwithstanding the use of thin gauge metal, the design of the present invention achieves strength equivalent or superior to cabinets made from heavier gauge metal. At the rear corner of the case envelope (FIG. 3A), the combination of the case back 30, rear perimeter flange 22 and vertical channel 56 adhesively bonded together provide a cabinet corner structure that is three times thicker than the individual sheet metal used to construct the cabinet and, along the side wall, twice as thick as the individual sheet metal pieces. (FIG. 3A). As can be seen in FIG. 3B, the combination of the vertical channel 56 with the front perimeter flange 20 return flange 26 creates a four sided corner tube or frame 82. As a result of these design features, even though the cabinet is constructed of thin gauge metal, critical strength is provided to the structural areas where extra strength and impact resistance are most necessary.

Strength and structural rigidity are also enhanced by the use of corner chevrons 84 and corner plates 86. The corner chevrons 84 are adhesively bonded to the front perimeter flange 20 prior to bonding the front vertical corner channels 56 to the case envelope. These stiffening elements further act to prevent side sway of the cabinet. Additionally, the corner plates 86, shown in FIG. 2, are bonded to the inside corners of the envelope top. These plates 86 prevent corner wrinkles or cracks which might otherwise occur during the stress of shipping or transit of the cabinet or if the cabinet is dropped. The invention further contemplates that these pieces could all be constructed from a single piece of metal to facilitate installation and assembly rather than as individual pieces.

The versatility of the present invention is further evidenced by the drawer construction. In particular, the drawer design incorporates a single drawer base unit 88 and two interchangeable drawer fronts 90.

Figure 8A:
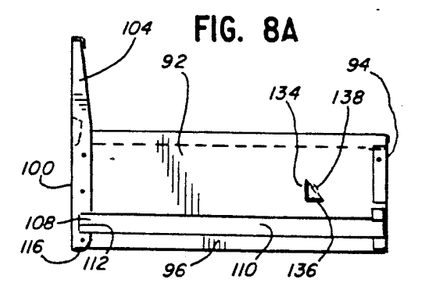
FIG. 8A is a side view of the base drawer unit with a letter drawer front.
Figure 8B:
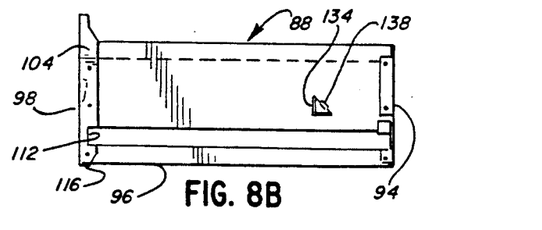
FIG. 8B is a side view of the base drawer unit with a box drawer front.

The base drawer unit 88 is comprised of two side walls 92, a back 94 and a bottom 96. The interchangeable drawer fronts 90 come in two sizes; a box drawer front 98 which is slightly taller than the drawer based unit 88 and a taller letter drawer front 100 which creates a deeper drawer. A base drawer unit 88 with a letter drawer front 100 is shown in FIG. 8A and a base drawer unit 88 with a box drawer 98 front is shown in FIG. 8B.

Figure 6:
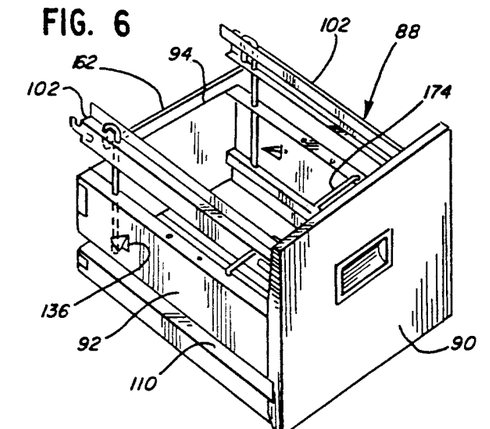
FIG. 6 is a perspective top view of a letter drawer further including holder rail accessories.
Figure 7:
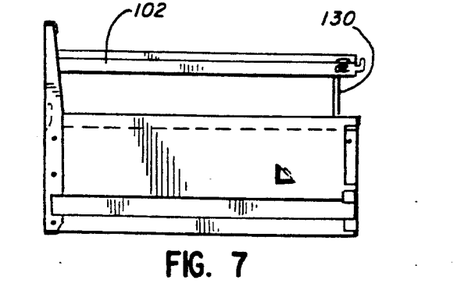
FIG. 7 is a side view of the letter drawer of FIG. 6.
Figure 12:
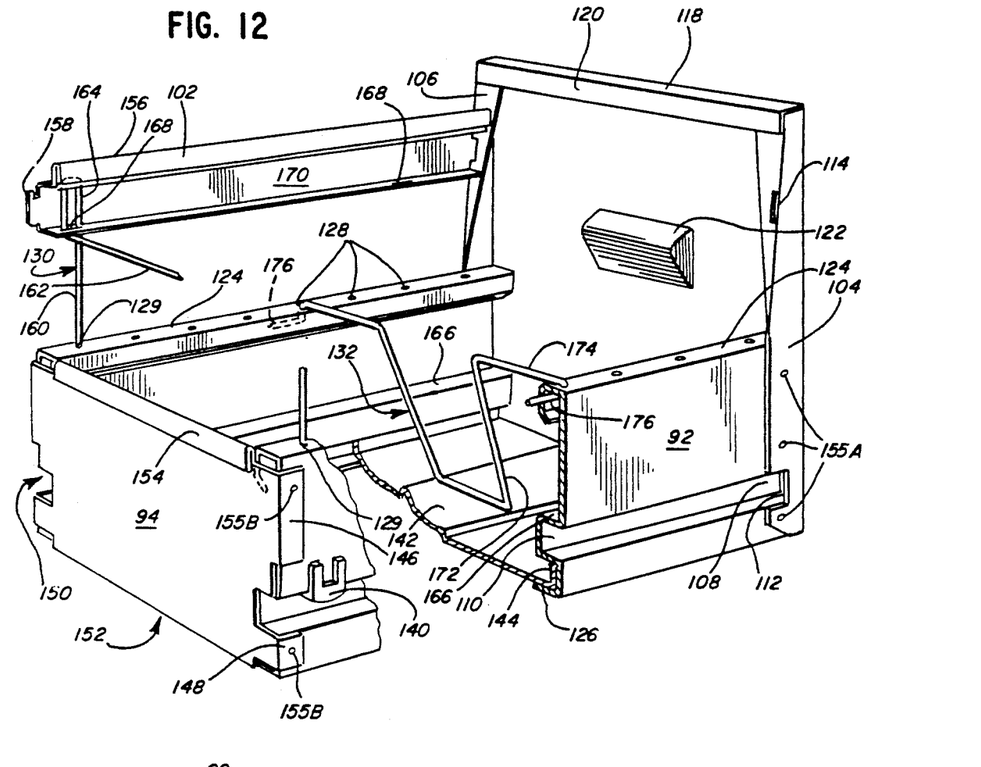
FIG. 12 is a rear elevated perspective view of the letter drawer shown in FIGS. 6, 7, partially broken away.

Because two sizes of drawer fronts are available, the case envelope 12 of the present invention can be constructed with either two, three or four drawers. By simply modifying the track assemblies 54, up to four drawer tracks 58 can be mounted on the vertical channels 56 in various configurations. Particularly, the same case envelope can be constructed to hold two large or letter drawers, four box drawers or two box drawers and a single letter drawer (See FIG. 1). In addition, any of these drawers can accommodate either a roller track 66 or a slide track 70, further increasing the various combinations. The letter drawer, FIG. 8A, can be further modified to accommodate standard hanging or suspended files. As shown in FIGS. 6, 7 and 12, a pair of holder rails 102 can be attached to the side walls 92 of the base unit 88 and the letter drawer front 100.

With reference to either the box or letter drawer, (FIGS. 8A, 8B) the separate drawer fronts 90 are each provided with two side flanges 104. In the case of the letter drawer front 100, the portion of the side flange 104 which extends above the drawer side wall 92 is further provided with a return flange 106 for additional rigidity and strength. Each side flange 104 is further provided with a cut out portion or notch 108 which corresponds to the drawer channel 110 in each drawer side wall 92. The vertical edge 112 of the notch acts as a drawer stop to align the face of the drawer front 90 with the front perimeter flange of the case envelope, when the drawer is closed, in a cabinet employing slide tracks 66. If the cabinet is constructed with roller tracks 70, a pad (not shown) is inserted inside the notch 108 on the inside surface of the drawer front to act as a drawer stop when shutting the drawer. Additionally, as can be seen in FIG. 12, the return flange 106 on the letter drawer front 100 is provided with a vertical slot 114 for engaging the holder rail 102 if this accessory option is selected.

As seen in FIG. 16, both drawer fronts 98, 100 may be cut from the same coil of prepainted metal 32. After the notches 108 are removed from the side edges, the side flanges 104 are formed. Subsequently, a bottom flange 116 is formed and then, as shown in FIG. 12, the top edge of the drawer front is folded twice to create a top flange 118 and a return flange 120 to overlap the side flanges 104 and the return flanges 106. While various types of handles may be employed in the illustrated embodiment a rectangular hole is cut in every drawer front 90 to allow insertion and attachment of a handle 122.

Figure 9:
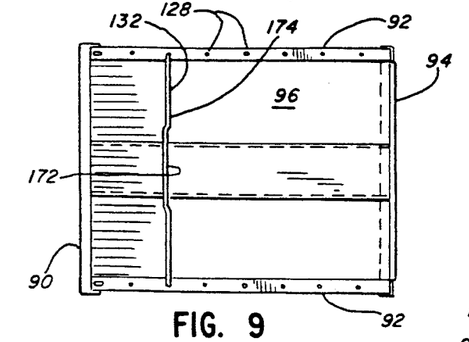
FIG. 9 is a top view of the letter drawer unit.
Figure 10:
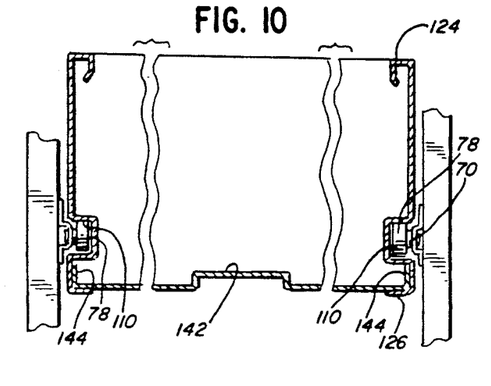
FIG. 10 is a broken cross sectional view of the base drawer unit of the present invention showing engagement with a roller track assembly.
Figure 11:
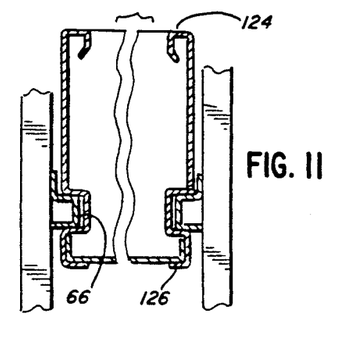
FIG. 11 is a broken cross sectional view of the base drawer unit of the present invention showing engagement with a slide track assembly.

As shown in FIGS. 10 and 12, both the left and right drawer side walls 92 are provided with a top and bottom flange 124 and 126 respectively, as well as an inwardly directed drawer channel 110. The drawer channel 110 is designed to slidably receive either the roller track 70 or the slide track 66. As seen in FIGS. 9 and 12, the top flanges 124 of the drawer side walls 92 are provided with a series of equidistant spaced holes 128. The hole 129 closest the rear end of each drawer side wall 92 is enlarged with respect to the remaining holes 128 and is designed for receiving, supporting and positioning an optional support 130 for supporting the rear or inward end of the holder rails 102 in position. The holes 128 are designed to receive and position a file follower 132 which can be adjustably positioned in any of the holes 128 to accommodate accumulated files of varying depth.

As best seen in FIGS. 8A and 8B, each side wall is also provided with an L-shaped slot 134. This slot 134 defines a tab 136 which, after the drawer has been inserted into the case envelope, can be bent outwardly to act as a drawer stop to prevent the drawer from being pulled out of the case envelope. A second, smaller screwdriver slot 138 is formed along the diagonal bend line of the tab 136 to facilitate the straightening of the tab when a drawer is to be removed from the case. Additionally, the rear edge of every side wall is provided with a grouping of three apertures (not shown) for telescopic snap engagement of a drawer glide 140. The drawer glide 140 is seen in FIG. 12 and is affixed in the drawer channel 110 only when a roller track assembly is being used. Each glide 140 extends over and closely adjacent the upper surface 73 of raised central portion 72 of the respective roller track 70 to support the inner end of the drawer thereon when the drawer is loaded and closed or partially closed. The glides thus accommodate the forces acting on the drawer due to the position of the rollers 78 at the front of the case envelope. The rollers are sized to fit closely (e.g., 0.015" clearance) within the drawer channels and thereby pairs of rollers provide cantilever support for each drawer when opened.

As best seen in FIG. 10, the drawer bottom 96 is provided with a raised central portion 142 and upstanding side flanges 144. The drawer bottom 96 is positioned on the bottom flanges 126 of the drawer side walls 92 with the side flanges 144 abutting the inside surfaces of the drawer side walls 92. The raised central portion 142 provides structural rigidity to the drawer structure.

As seen in FIG. 12, each side of the drawer back 94 is provided with an upper and lower side flange 146 and 148 respectively. These side flanges engage the outside surfaces of the drawer side wall 92. In addition, a notch 150 is cut from the drawer back 94 between each of the side flanges to provide access to the drawer channels 110 so that the drawer can be inserted into the case envelope 12 and the drawer channels 110 can engage the drawer tracks 58 of the track assemblies 54. The drawer back 94 also has a bottom flange 152 which assists in supporting the drawer bottom 96 and a top flange 154 for providing strength and rigidly to the drawer structure. The drawer back 94 is attached to the drawer side walls and drawer bottom by mechanically fastening the upper side flanges to the side walls and the lower side flanges to the drawer bottom and drawer side wall as shown in FIG. 12.

The drawers are assembled by positioning and fastening the side walls 92 to the respective drawer front 90. This fastening may be mechanical fastening of the side flanges 104 to the overlapped side walls as shown in FIG. 12 at 155A. The bottom is then slid into position on the bottom flanges 126 and the back wall panel 94 is then applied and secured, as by fasteners 155B.

Turning now to the letter drawer, seen in FIGS. 6, 7 and 12. By adding a pair of hang rails 102 the letter drawer can be adapted to accept suspended or hanging files. The holder rails 102 are symmetrically roll formed to allow any holder rail to be installed on either the right or the left side of a letter drawer. The holder rail 102 is a three-sided open channel shaped member further having an upstanding flange 156. The flange is folded over upon itself to provide structural strength to the holder rail 102. A hook or locking tab 158 is formed at each end, for engaging the slot 114 formed in the return flange 106 of the drawer front 100 to support the front of the holder rail 102. The rear of the holder rail is supported by the support 130 as shown in FIGS. 6, 7 and 12.

The support 130 preferably is a simple bent rod or wire component. It is defined by two vertical legs 160 and a horizontal cross member 162 interconnected by a pair of looped or curved portions 164. The legs 160 are inserted into the special holes 129 in the top flange 124 of the side wall 92 and rest on the top surface 166 of the drawer channel 110. The looped or curved portions 164 extend through a slot 168 formed in the channel portion 170 of the holder rail 102 so that the rear portion of the holder rail 102 rests on and is supported by its lower horizontal flange bearing on the cross member 162. The top or upstanding flange 156 provides a rail to be engaged by and support the hanging or suspended files. It will be appreciated that insertion and removal of the support and the holder rails is accomplished by simply placing the support and the rails in position, and therefore is a simple task requiring no fasteners or tools.

As seen in FIG. 12, the file follower 132 engages the holes 128 in the top flange 124 of the drawer side wall 92. The follower 132 preferably is a bent wire or rod component and has a U-shaped central portion 172 which extends downwardly into the drawer to hold the files in position. A pair of arms 174 extend outwardly from the center portion and are bent to an L-shape configuration at each distal end 176 to engage the holes 128 in the drawer side wall top flange 124. The follower can be inserted, removed and repositioned very simply by insertion and removal of the ends 176 through the respective holes 128.

Figure 17:
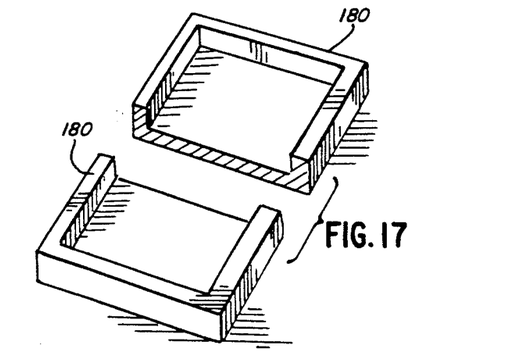
FIG. 17 is an elevated perspective view of the first squaring member of the present invention.
Figure 18:
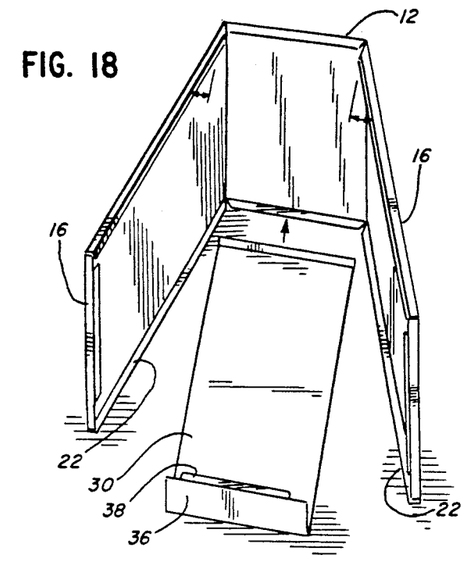
FIG. 18 is an elevated perspective view of the case envelope and case back prior to assembly.
Figure 19:
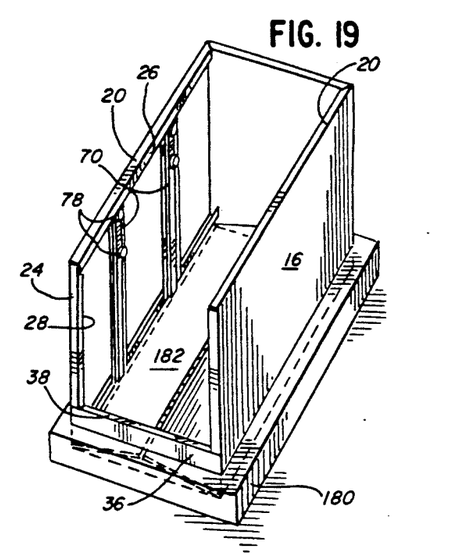
FIG. 19 is an elevated perspective view showing the case envelope, case back and track assemblies positioned in the first squaring member during assembly.

FIGS. 17-21 show the basic steps involved in the assembly of the present filing cabinet. Essentially, the case envelope 12 is placed on its back or with the rear perimeter flange 22 in contact with a conveyor or similar support. A bead of adhesive is then placed on the inside surface of the rear perimeter flange 22 and, with the side walls 16 opened slightly at the bottom to facilitate assembly, the back panel 30 is positioned in the envelope 12 and the side walls 16 are closed to squarely encompass the back panel 30. A roller or similar device (not shown) is then manually applied to the edges of the back wall 30 to flatten and spread the adhesive bead between the rear perimeter flange 22 and the back wall 30. In order to insure square alignment between the envelope and back wall, the structure is then placed in a first squaring frame 180. (FIGS. 17, 19).

Next, the track assemblies 54 are wedge-fit into the cabinet to hold the back wall 30 in place and to ultimately provide overall structural ruggedness to the cabinet. As previously described and shown in FIG. 3, the track assemblies 54 are adhesively bonded to the back wall 30 and envelope side walls 16. However, to promote the bonding of the rear vertical corner channels 56R to the envelope side walls 16, an expander 182 is temporarily placed in the cabinet to provide the necessary lateral pressure. The frame 180 provides the complementary reactive inward forces. The expander is simply two pieces of flat metal joined by a piano hinge or similar device and having a combined width slightly greater than the width of the case envelope. The front vertical corner channels 56F do not require this lateral pressure because of the manner in which the front perimeter flange 20 and return flange 26 coact to capture the front corner channels 56F (FIG. 3B).

Figure 20:
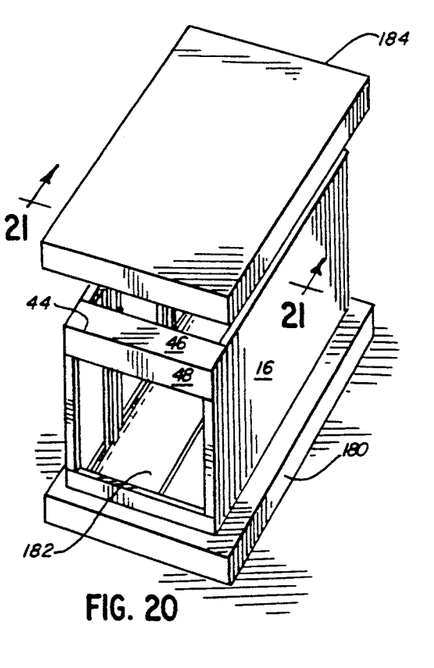
FIG. 20 is an elevated perspective view of the cabinet shown on FIG. 19 after the kickplate has been positioned for assembly and prior to placing the second squaring means on the cabinet.
Figure 21:
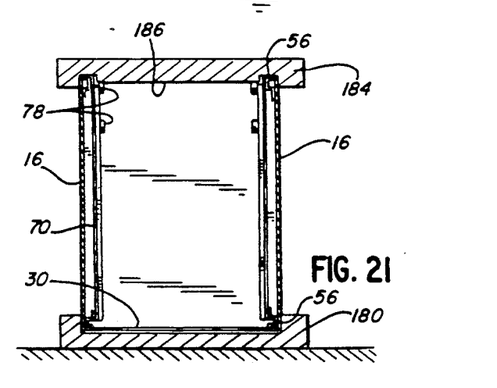
FIG. 21 is a cross sectional view of the cabinet shown in FIG. 20 after the second squaring member has been placed on the cabinet.

The kickplate 44 is the last component to be permanently attached to the case envelope 12. As seen in FIG. 20, the kickplate spans the envelope side walls 16 and overlaps the front perimeter flanges 20 and the side wall base flanges 24. With adhesive applied first, the kickplate 44 is positioned on the envelope and a second squaring frame 184 is placed on the envelope (FIG. 20). As seen in FIG. 21, the second squaring frame 184 has a raised center portion 186 which allows the frame to encompass the envelope walls and prevent the walls from any undesirable movement which would cause the pieces to be assembled in an unaligned manner. In addition, while the squaring frames are primarily employed for maintaining a square alignment of component parts, the second frame 184, due to its weight, does apply a slight downward force which assists in bonding the back wall 30 to the rear perimeter flange 22 of the envelope.

With the two squaring frames 180 and 184 in place, and the kickplate 44 and back wall 30 securely positioned, the kickplate bottom portion 48 and the back wall bottom flange 46 are mechanically fastened to the side wall base flanges 24. After the adhesive has set, the completed cabinet is then removed from the frames 180 and 184 and the expander 182 is removed from inside the cabinet. Lastly, the drawers, having been previously assembled, are placed in the cabinet to complete the assembly.

It is also contemplated by the present invention that a modified filing cabinet can be constructed with the intention of stacking it on top of a first filing cabinet to provide a filing cabinet of at least twice the capacity. While the same versatility in size and number of drawers can be available in the second or upper cabinet, the kickplate would be eliminated to reduce any unnecessary space between the drawers of the two cabinets. A bottom strap 177, shown in FIG. 2, would replace the kickplate to hold the case side walls together. The case envelope, even though shorter, can be cut from the same coil of sheet metal as is the standard size cabinet. In addition, it is also contemplated that a one drawer case envelope can be manufactured to be added to the standard case envelope to create a stacked three drawer cabinet or even to create a stand alone one drawer unit.

For physical attachment, a pair of hooks would be provided in the back of the upper or add on cabinet to engage slots formed in the back panel of the lower cabinet to lock the cabinets together. In addition, an adhesive may be applied to the bottom of the strap 176 and to the bottom surface of the bottom flange of the case back so that the upper and lower cabinets are adhesively bonded together as well.

Figure 14:
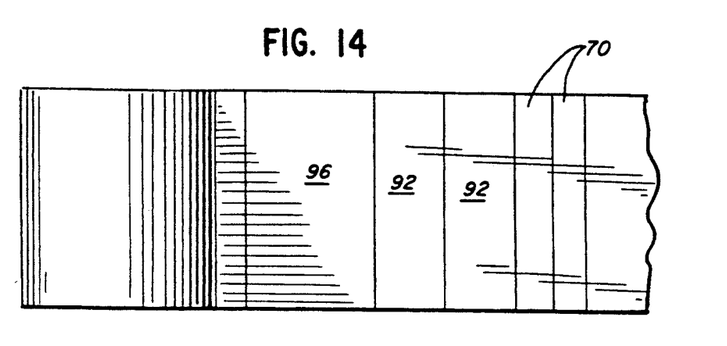
FIG. 14 is a top view of another prefinished sheet steel blank strip of indeterminate length supplied in coil form used to make the drawer bottom, drawer left and right sides and roller track members.
Figure 14A:
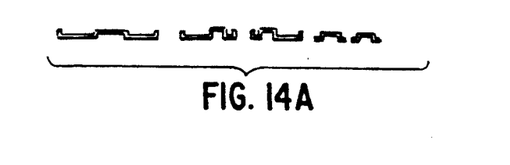
FIG. 14A is a schematic end view of the drawer bottom, drawer left and right sides and roller track member produced from the prefinished steel strip shown in FIG. 14.

It should also be noted that the widths of the rolls of metal are correlated to the respective component sizes to avoid unnecessary material waste, to achieve maximum efficiency in manufacture and to realize a final product at low cost. Specifically, the cabinet envelope is cut and formed by bending from one width of metal with the width determined by the depth of the cabinet (FIG. 15). Similarly, the drawer bottom, drawer side walls and roller tracks are cut and formed by bending from a second width of metal with the width determined by the depth of the drawer (FIG. 16). The drawer fronts, drawer back, cabinet back panel and kickplate are cut and formed by bending from a third width of metal with the width determined by the width of the cabinet (FIG. 14). The vertical corner channels and slide tracks, rather than cut and folded, are roll formed from a fourth roll of metal with the width determined by the particular width of these pieces (FIG. 13).

Where mechanical fasteners are noted, the preferable fastening technique is one which deforms and interlocks the overlapping layer of metal, thereby avoiding welding and attendant marring of the prefinished surfaces and also avoiding need for discrete separate fastening elements.

While the preferred embodiment discloses the use of prepainted metal, the scope of the present invention includes all varieties of prefinished metal. For example, in addition to prepainted metals, other varieties of prefinished metals include plated metal, anodized metal and vinyl coated metal.

It will thus be seen that improved file cabinets and methods of their construction have been provided which meet the aforestated objects, requirements and desirable characteristics.

It is contemplated by the appended claims to cover any such modification and other embodiments as incorporate those features which constitute the essential features of this invention within the true spirit and scope of the following claims.

What is claimed is:

1. A method of assembling a rectangular filing cabinet comprising the steps of:
   a. forming a unitary wrap around cabinet envelope having a top and two side walls defining an open front, bottom, and back, said envelope including unitary perimeter flanges extending from said side walls inwardly of said back open side and said front open side;
   b. placing a back panel member on said back perimeter flanges with adhesive therebetween, adhesively, bonding said back panel member to said envelope;
   c. holding said envelope and back panel structure by first aligning and squaring means to assist in maintaining said envelope and back panel in an aligned relationship while said adhesive sets;
   d. wedge fitting structural members between said back panel and said front perimeter flanges to hold said back panel against said back perimeter flanges during bonding and thereafter to reinforce said cabinet;
   e. positioning a kickplate across a portion of said front and bottom open sides, applying a second aligning and squaring means to said envelope and kickplate and fastening
   f. removing said first and second aligning means and said squaring means.

2. The method of claim 1 including positioning said envelope and back panel structure within an aligning and squaring frame during step c and applying outward lateral pressure on said structural member during step d.

3. The method of claim 1 including the steps of bonding said structural members to said envelope by adhesive.

4. The method of claim 3 including placing adhesive between said structural members and said envelope prior to said wedge fitting step.

5. A method for forming a rectangular filing cabinet from thin prefinished metal comprising the steps of:

a. forming an integral wraparound cabinet envelope having a top and two side walls defining an open front, bottom and back, said envelope flanged inwardly along its edges to provide a front perimeter flange, a rear perimeter flange and a pair of base flanges at the bottom of said side walls;

b. forming a cabinet back panel having a top and bottom flange;

c. applying adhesive to the inside surface of said rear perimeter flange, the upper surface of said back panel top flange and the top lateral edges of said back panel bottom flange;

d. positioning said back panel inside said cabinet envelope so that said back panel top flange abuts the inside surface of said envelope top, the perimeter edges of said back panel abut said inside surface of said rear perimeter flange and said top lateral edges of said back panel bottom flange abut the bottom of said side wall base flanges, adhesively, bonding said back panel to said cabinet envelope;

e. forming a pair of track assemblies each including a pair of front and rear vertical corner channels interconnected by at least one drawer track;

f. applying adhesive to each rear corner of said envelope and to both front vertical channel members of said track assemblies;

g. positioning said front vertical channel members of said track assemblies inside said front perimeter flanges of said envelope, and rotating said track assemblies to wedge said rear vertical channels into said rear corners of said cabinet envelope, adhesively, bonding said track assemblies to said envelope;

h. forming a kickplate to enclose the bottom front end of said envelope, said kickplate having an upper portion including an inwardly directed flange, said upper portion extending across said front perimeter flange, and a bottom portion including an upwardly extending flange, said bottom flange extending across said envelope side wall base flanges;

i. attaching said kickplate to said envelope by securing said upper portion to said front perimeter flange and securing said lower portion to said side wall base flanges;

j. forming at least one drawer, said drawer having a front, bottom, back and two sides, said sides being shaped to slidably engage said drawer track wherein said drawer can reciprocate along said drawer track between an open and closed position;

k. inserting said drawer into said cabinet envelope.

6. The method set forth in claim 5 including the further step of mechanically fastening the bottom flange of the back panel and the lower portion of the kickplate to the base flanges of the envelope side walls.

7. The method for forming a filing cabinet from thin prefinished metal as set forth in claim 5 wherein:

a. said envelope is cut and formed by bending from a first discrete width of prefinished sheet metal, b. said vertical channels are roll formed and cut from a second discrete width of prefinished sheet metal, c. said drawer front, drawer back, cabinet back panel and kickplate are cut and formed by being from a third discrete width of prefinished sheet metal, d. said drawer sides and drawer bottom are cut and formed by bending from a fourth discrete width of prefinished sheet metal, and e. said drawer tracks are formed from one of said second discrete width of prefinished sheet metal and said fourth discrete width of prefinished sheet metal.

8. The invention as in claim 7 wherein said prefinished metal is prepainted on at least one surface thereof.

9. The invention as in claim 8 in which said metal is prepainted on both surfaces thereof.

10. A method of forming a vertical rectangular metal storage cabinet comprising the steps of:

a. providing thin, flat sheet metal stock;

b. forming said thin sheet metal stock into multiple components which are complementary and interfittable into overlapping relationship with one another whereby said components define a vertical rectangular hollow cabinet case having one side open for access to such cabinet and with said components overlapping one another adjacent at least two of the vertical corners of said cabinet to provide interfaces therebetween extending substantially the full vertical length of the respective vertical corners;

c. applying adhesive substantially continuously throughout the vertical length of at least one such interface adjacent each of said at least two vertical corners of said cabinet and interfitting said components into such overlapping relationship with one another and thereby forming such a rectangular hollow cabinet case having one side open for access to said cabinet; and d. securing said components to one another substantially continuously throughout the length of said interfaces by adhering them to one another with said adhesive and thereby rigidly fixing said interfitted components into a rugged storage case of such thin metal stock.

11. The invention as in claim 10 including applying such adhesive substantially throughout the areas of overlap of such components and laminating such components to one another substantially throughout said areas of overlap.

12. The invention as in claim 10 and wherein said forming step includes bending at least one of said components into a rectangular flange along one edge to define a front perimeter flange for said access opening.

13. The invention as in claim 10, and forming certain portions of said thin sheet metal stock into reinforcing member components each having multiple flanges in angular cross-section relationship to one another, and adhesively securing said reinforcing members to interior vertical corner-forming surface of other said components forming such cabinet case.

14. The invention as in claim 10 and wherein said overlapping of components and securement by adhesive therebetween are provided adjacent each vertical corner of said cabinet.

15. The invention as in claim 10 including providing said metal stock prefinished on at least one side.

16. The invention as in claim 10 including providing said metal stock prefinished on both sides.

17. The invention as in claim 10 including providing said metal stock prepainted on both sides.

18. The invention as in claim 10 including forming certain portions of said thin sheet metal stock into elongated reinforcing member components each of a length to extend substantially the full height of said rectangular cabinet case, and laminating said reinforcing members in internal corners of said rectangular cabinet case by adhesive securement to the inside surface of other said components forming said cabinet case.

19. The invention as in claim 18, including laminating said reinforcing members in each of the vertical internal corners of said rectangular cabinet case.

20. The invention of claim 19 including the step of joining said elongated reinforcing members into pairs by affixing at least one drawer track member to each elongated member of each such pair and extending therebetween prior to laminating the respective reinforcing members in the respective cabinet case.

21. The invention as in claim 21 and wherein said overlapping of components and securement by adhesive therebetween are provided adjacent the rear vertical corners of said cabinet.

22. The invention as in claim 10 and wherein said overlapping of components includes overlapping of vertical external panels adjacent the rear vertical corners of said cabinet and said securement by adhesive is provided therebetween.

23. The invention as in claim 22 and wherein said overlapping of components and securement by adhesive therebetween are provided adjacent each vertical corner of said cabinet.

24. A method of forming a rectangular storage cabinet case of sheet metal, said cabinet case being fabricated of a plurality of panel members, each of said panel members including at least one panel for defining one wall of said case, and certain of said panel members including flanges extending from edges of said panels thereof, each of said panel members having a transverse dimension which equals the corresponding dimension of the respective panel plus the overall length of any flanges extending therefrom in the corresponding direction, said panel members including at least one panel member having a first transverse dimension and the remainder of said panel members having a second transverse dimension, comprising:
   a. Providing a first flat sheet metal blank of indeterminate length and of a first predetermined width which corresponds to said first transverse dimension;
   b. Cutting said panel members of said first transverse dimension from said first flat sheet metal blank with said first transverse dimension of said panel members and said first predetermined width of said first flat sheet metal blank in registry with one another;
   c. Providing a second flat sheet metal blank of indeterminate length and of a second predetermined width which corresponds to said second transverse dimension;
   d. Cutting said panel members of said second transverse dimension from said second flat sheet metal blank with said second transverse dimension of said panel members and said second predetermined width of said second flat sheet metal blank in registry with one another; and
   e. Assembling said panel members together into the configuration of a storage cabinet case, including folding the flanges of the respective panel members into their assembly positions relative to the respective panels, and assembling and securing said panel members together whereby said panel members cooperate with one another to form the storage cabinet case in said configuration.

25. The invention as in claim 24, wherein said flat sheet metal blanks are prefinished prior to said cutting steps, and including securing said panel members together by adhering said flanges to adjacent panel members with an adhesive without penetrating or marring the finish on said blanks.

26. The invention as in claim 24 wherein said blanks as provided for forming a cabinet case by said method have a finish coating on both sides thereof and including securing said panel members together in said configuration without penetrating or marring said finish on said blanks.

27. The invention as in claim 24, including cutting one of said panel members to include three joined panels for defining three walls of such cabinet case.

28. The invention as in claim 27, wherein said one of said panel members is cut to form two sides and the top of said case.

29. The invention as in claim 28, including cutting a panel member to form the back wall of said case and a panel to form a front kick plate of said case of the same transverse dimension as one another and from the same sheet metal blank.

30. A method of making a rectangular storage cabinet case having predetermined depth, height and width dimension from stocks of thin gauge sheet metal, each of said stocks having a different predetermined width dimension between said edges thereof corresponding generally to one of said dimensions of the cabinet and having an indeterminate length, comprising:
   a. cutting said stocks transverse to their length at predetermined spacings therealong to form blanks of determinate length dimensions corresponding to said spacings, each of said blanks having a width dimension corresponding to the respective predetermined width dimension of the respective stock between side edges thereof and generally to the respective predetermined dimension of the cabinet;
   b. bending and interfitting said blanks of said predetermined width dimensions to constitute the side, top and back wall panels of a rectangular filing cabinet case with edge portions of said blanks in overlapping relation with one another, with each said width dimension of each of said blanks corresponding to one of said cabinet case dimensions and without trimming said side edges; and
   c. affixing said overlapping edge portions of said blanks together in said interfitting cabinet-forming relationship whereby said blanks cooperate with one another to form the storage cabinet.

31. The invention as in claim 30, and affixing said panels to one another by adhesively laminating said overlapping edge portions of said blanks to one another.

32. The invention as in claim 31 in which said stocks are prefinished on at least one surface thereof.

33. The invention as in claim 31 in which said stocks are prepainted on both surfaces thereof.

34. A method of making a rectangular storage cabinet having predetermined depth, height and width dimensions from stocks of thin gauge sheet metal, each of said stocks having a different predetermined width dimension corresponding generally to one of said dimensions of the cabinet and having an indeterminate length, comprising:
   cutting blanks of determinate lengths from said stocks, each of said blanks having a width dimension corresponding to the respective predetermined width dimension of the respective stock and generally to the respective predetermined dimension of the cabinet, and bending said blanks of said predetermined width dimensions to form interfittable side, top and back wall panels which interfit with one another to define the rectangular storage cabinet, wherein said cutting and bending include:

cutting a first blank of determinate length from a first of said stocks, said first blank having a width dimension corresponding to the predetermined width dimension of the respective stock and generally to the predetermined depth dimension of the cabinet;

bending said first blank to form a unitary envelope having a pair of generally parallel upright side wall panels interconnected by a generally horizontal top wall panel;

cutting a second blank of a determinate length from a second of said stocks, said second blank having a width dimension corresponding to the predetermined width dimension of said second stock;

forming said second blank into a back panel having a width dimension corresponding generally to the width dimension of said second blank and generally to the predetermined width dimension of the cabinet; and interfitting said panels with one another and thereby forming such a rectangular storage cabinet, and affixing said panels together in said interfitting cabinet-forming relationship, including affixing said back panel to corresponding back edges of the envelope top and side wall panels.

35. The method as in claim 34 in which at least each first and second stock is prefinished on at least one surface thereof forming the cabinet exterior.

36. The method as in claim 34 wherein the width dimension of said first blank includes width dimensions of peripheral flanges formed along the front and back edges of said envelope.

37. The invention as in claim 34 and which includes:

cutting a third blank of a determinate length from said second stock;

bending said third blank to form a kickplate having a width dimension generally corresponding to the cabinet predetermined width dimension, and affixing the kickplate to corresponding lower front portions of the envelope side walls.

38. The invention as in claim 37 and which includes:

cutting and bending a plurality of fourth blanks of like determinate lengths from a third of said stocks, each fourth blank having a blank width dimension corresponding to the predetermined width dimension of said third stock and having a length corresponding generally to the predetermined height dimension of the cabinet, said bending of said fourth blanks being effected along lines parallel to the length of such blanks to form elongate structural support elements; and affixing each support element to an interior surface of the cabinet.

39. The method of claim 38 including the additional steps of:

cutting fifth blanks from said second stock;

bending one fifth blank to form a drawer front and a second fifth blank to form a drawer back cutting sixth blanks of determinate length from a fourth stock and bending said sixth blanks to form drawer side walls and a drawer bottom wall, said sixth blanks having a width dimension corresponding to the predetermined width dimension of said third stock and corresponding generally to a drawer length dimension;

assembling said drawer front, back, side walls and bottom wall to form a drawer; and slidably mounting said drawer within the cabinet interior through an opening formed in a front wall of the cabinet.

40. The method of claim 33, and affixing said envelope, back panel and structural support elements to one another by adhesives.

41. The invention as in claim 40 and including positioning and so affixing said support elements in vertical interior corners of the cabinet.

42. A method of forming a rectangular storage cabinet comprising the steps of:

a. providing thin, flat sheet metal stock having at least one prefinished surface;

b. forming portions of said stock into multiple components which are complementary and interfittable with one another in an edge-overlapping relationship;

c. including forming portions of thin, flat sheet metal stock into elongate reinforcing members each of a length to extend substantially the full height of said rectangular cabinet;

d. interfitting the formed portions in such edge-overlapping relationship to form a rectangular cabinet with said prefinished surfaces exteriorly exposed to provide an exterior finished surface of said cabinet and one side of said cabinet provided with an access opening; and e. securing said interfitted portions in said edge-overlapping relation, including laminating said overlapping portions to one another with an adhesive and adhesively laminating each of said reinforcing members to interior surfaces of said interfitted portions defining an interior upright corner of said rectangular cabinet, without penetrating or marring the cabinet exterior finished surface.

43. The invention as in claim 42, and so laminating one of said reinforcing members in each of the upright internal corners of said rectangular cabinet enclosure.

44. A method of forming an upright storage cabinet having vertical corners, comprising the steps of:

a. providing thin, flat sheet metal stock having at least one prefinished surface;

b. forming portions of said stock into multiple components which are complementary and interfittable with one another in an edge-overlapping relationship;

c. interfitting the formed components in such edge-overlapping relationship to form an upright rectangular storage cabinet with said prefinished surfaces exteriorly exposed to provide an exterior finished surface of said cabinet and one side of said cabinet provided with an access opening;

d. securing said interfitted components in said edge-overlapping relation by laminating overlapping portions to one another with an adhesive and thereby rigidly fixing said interfitting components into a rugged storage cabinet of said thin metal stock having an exterior finished surface.

45. The invention as in claim 44 including applying adhesive substantially throughout each area of overlap of such portions and laminating such components to one another therewith substantially throughout said areas of overlap.

46. The invention as in claim 44 including forming said components to be interfittable in edge-overlapping relationship along areas adjacent a plurality of the corners of said cabinet, interfitting such components in such edge-overlapping relationship and including laminating said overlapping portions to one another with an adhesive substantially continuously throughout the length of said edge-overlapping relationships adjacent said corners of said cabinet.

47. The invention as in claim 44 wherein the forming and interfitting steps form an upright cabinet case with multi-sided structural shapes adjacent a plurality of the vertical corners thereof and with each side of each such structural shape including multiple thicknesses of said thin metal stock.

48. The invention as in claim 47 including forming, interfitting and laminating a plurality of said adhered overlapping portions as sides of said structural shapes.

49. The invention as in claim 44 wherein said forming, interfitting and securing steps are carried out without penetrating or marring said exterior finished surface of the cabinet.

50. The invention as in claim 44 and including bending at least one of said portions into a rectangular flange along one edge to define a front perimeter flange along such access opening.

51. A method of forming an upright storage cabinet having vertical corners, comprising the steps of:
 a. providing thin, flat sheet metal stock;
 b. forming portions of said stock into multiple components which are complementary and interfittable with one another in an edge-overlapping relationship;
 c. interfitting the formed components in such an edge-overlapping relationship to form an upright rectangular storage cabinet with one side of said cabinet provided with an access opening;
 d. wherein the forming and interfitting steps form an upright cabinet case with multi-sided structural shapes adjacent a plurality of the vertical corners thereof and with each side of each such structural shape including multiple thicknesses of said thin metal stock;
 e. securing said interfitted components in said edge-overlapping relation by laminating overlapping portions to one another with an adhesive and thereby rigidly fixing said interfitting components into a rugged storage cabinet of said thin metal stock.

52. The invention as in claim 51 including applying adhesive substantially throughout the lengths of overlap of such portions and laminating such components to one another therewith substantially throughout said lengths of overlap.

53. The invention as in claim 51 including forming certain portions of said thin sheet metal stock into reinforcing member components each having multiple flanges in relative angular cross-section relationship, and adhesively securing said reinforcing member components to interior surfaces of other of said interfitted components defining interior vertical corners of the cabinet.

54. The invention as in claim 51 wherein said interfitting and forming steps include forming multi-sided vertical structural shapes extending substantially the full height of said cabinet adjacent each vertical corner thereof.

55. The invention as in claim 51 wherein said interfitting and forming steps include forming multi-sided vertical structural shapes adjacent each vertical corner of said cabinet.

56. The invention as in claim 51 including forming a plurality of said adhered overlapping portions into sides of said structural shapes.

57. The invention as in claim 51 including forming said components to be interfittable in edge-overlapping relationship along a plurality of areas each of which is adjacent one of said vertical corners and each extending substantially the full height of said cabinet, interfitting such components in such edge-overlapping relationship and including laminating said overlapping portions to one another with an adhesive substantially continuously throughout the length of said edge-overlapping relationships adjacent said plurality of the vertical corners of said cabinet.

58. The invention as in claim 57 and wherein each of said overlapping edge portions adjacent said vertical corners forms one side of one of said structural shapes.

59. The invention as in claim 53 including forming each of said reinforcing member components of a length to extend substantially the full vertical height of said rectangular cabinet.

60. The invention as in claim 59, and adhesively securing one of said reinforcing member components in each of the interior vertical corners of the cabinet.

* * * * *